US009372773B2

(12) United States Patent
Greathouse et al.

(10) Patent No.: US 9,372,773 B2
(45) Date of Patent: Jun. 21, 2016

(54) USER-LEVEL HARDWARE BRANCH RECORDS

(71) Applicant: Advanced Micro Devices, Inc., Sunnyvale, CA (US)

(72) Inventors: Joseph Lee Greathouse, Austin, TX (US); Anton Chernoff, Littleton, MA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 393 days.

(21) Appl. No.: 13/916,417

(22) Filed: Jun. 12, 2013

(65) Prior Publication Data

US 2014/0372734 A1    Dec. 18, 2014

(51) Int. Cl.
*G06F 9/44*  (2006.01)
*G06F 11/30*  (2006.01)
*G06F 9/30*  (2006.01)

(52) U.S. Cl.
CPC .............. *G06F 11/30* (2013.01); *G06F 9/3005* (2013.01)

(58) Field of Classification Search
CPC .................................................... G06F 9/38
See application file for complete search history.

(56) References Cited

U.S. PATENT DOCUMENTS 7,181,600 B1 *  2/2007  Uhler .................. G06F 9/30101
                                                      712/229
7,620,803 B2 * 11/2009  Kudo ...................... G06F 9/325
                                                      712/200

* cited by examiner

*Primary Examiner* — Cheng-Yuan Tseng
(74) *Attorney, Agent, or Firm* — Volpe and Koenig, P.C.

(57) ABSTRACT

A processor, a method and a computer-readable medium for recording branch addresses are provided. The processor comprises hardware registers and first and second circuitry. The first circuitry is configured to store a first address associated with a branch instruction in the hardware registers. The first circuitry is further configured to store a second address that indicates where the processor execution is redirected to as a result of the branch instruction in the hardware registers. The second circuitry is configured to, in response to a second instruction, retrieve a value of at least one of the registers. The second instruction can be a user-level instruction.

15 Claims, 5 Drawing Sheets

USER-LEVEL HARDWARE BRANCH RECORDS

BACKGROUND

1. Field

The present embodiments relate generally to semiconductor processors and, in particular, to recording software control flow information in processors.

2. Background

Many software tools could benefit from receiving information about the control flow of a piece of code. For example, control flow information can include information that describes the order in which program instructions have been executed. Control flow information can also include a listing of control transfers, such as information on where a branch instruction came from and where the branch jumped to.

Software development tools, such as debuggers, implement backtrace capabilities that can provide a programmer with a listing of the instructions and functions that led to the current point of code execution. The development tools could benefit from control flow information. Other examples of software benefitting from control flow information include software that records the execution of a program for later replay and software that engages in re-execution of code in environments such as simulators. Additionally, certain types of programs or processes, such as kernel processes or thread management libraries, may need to dynamically access the value of the previous program counter, but accessing this information can be complicated using existing solutions. Control flow information can assist in this operation.

Recording this control flow information can be a slow and laborious process. For example, software-based implementations that record every branch and return address may cause significant runtime overheads. Other hardware-based mechanisms for recording branch addresses are not optimized for runtime execution or are only available in kernel-mode operation.

BRIEF SUMMARY

Therefore, what are needed are microprocessors with branch recording hardware that is optimized for runtime execution and accessible to user-mode software.

Some embodiments provide a processor, a method and a computer-readable medium for recording branch addresses. The processor comprises a set of hardware registers and first and second circuitry. The first circuitry is configured to store a first address associated with the branch instruction in the set of hardware registers. The first circuitry is further configured to store a second address that indicates where the processor execution is redirected to as a result of the branch instruction in the set of hardware registers. The second circuitry retrieves a value of at least one of the registers in response to a second instruction. The second instruction can be a user-level instruction.

Further features and advantages of the embodiments, as well as the structure and operation of various embodiments, are described in detail below with reference to the accompanying drawings. It is noted that the embodiments are not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the embodiments and, together with the description, further serve to explain the principles of the embodiments and to enable a person skilled in the relevant art(s) to make and use the embodiments.

Figure 1:
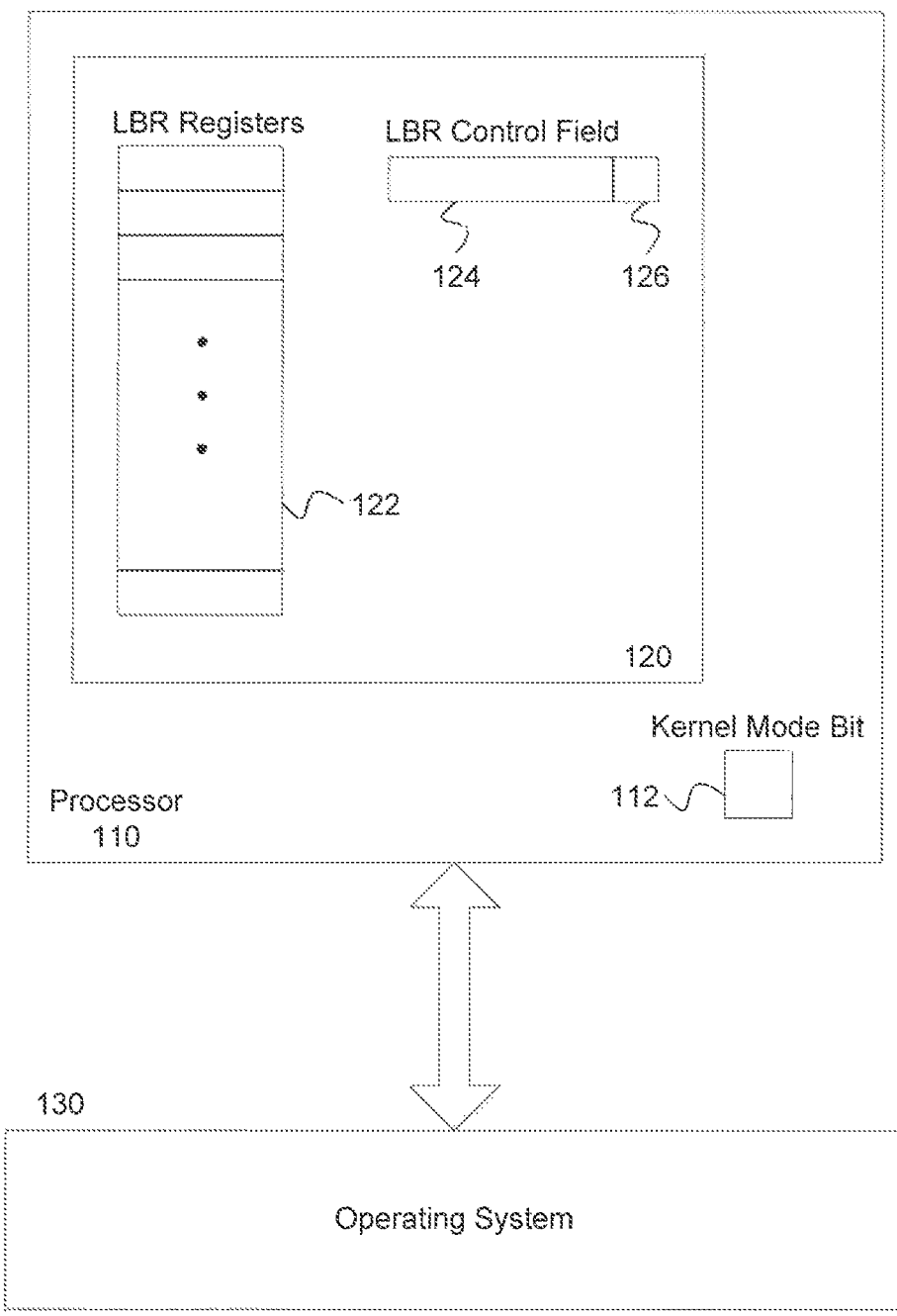
FIG. 1 is a block diagram of an illustrative computer processor operating environment, according to an embodiment.

The features and advantages of the embodiments will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

In the detailed description that follows, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The term "embodiments" does not require that all embodiments include the discussed feature, advantage or mode of operation. Alternate embodiments may be devised without departing from the scope of the disclosure, and well-known elements of the disclosure may not be described in detail or may be omitted so as not to obscure the relevant details. In addition, the terminology used herein is for the purpose of describing particular embodiments only and is not intended to be limiting of the disclosure. For example, as used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Modern microprocessors can operate in kernel mode or user mode. When in kernel mode, a processor allows access to read and write certain registers that are otherwise inaccessible in user mode. For example, Model-Specific Registers (MSRs) can typically only be accessed using privileged kernel mode instructions. The operating system can set the processor into kernel mode and execute kernel mode instructions. However, user-level processes running in the operating system may not be able to set the processor into kernel mode.

The present embodiments are directed at providing user-level processes with access to branch tracing information. The embodiments are further directed at providing branch tracing information to user-level processes, while maintaining the security of kernel-level branch tracing information. More specifically, in certain embodiments, a processor can provide access to branch tracing to a user-level process without permitting this process access to branch tracing information related to other processes.

FIG. 1 is a block diagram of an illustrative computer processor operating environment 100, according to an embodiment. In one example, operating environment 100 includes a processor 110 interacting with an operating system 130.

In one example, a processor 110 includes a last branch record (LBR) block 120 and a mechanism to indicate whether the processor 110 is executing a kernel-mode process (or instruction) or a user-mode process (or instruction). In some embodiments, the mechanism to indicate whether the processor 110 is executing a kernel-mode process (or instruction) or a user-mode process (or instruction) includes a storage element (e.g., a register, a flip flop, etc.) to store a kernel mode bit 112. LBR block 120 includes LBR registers 122, a control register to store a LBR control field 124 and a storage element to store a user-mode LBR control bit (UMLBR) 126.

In one example, kernel mode bit 112 can be set by the operating system 130 in order to access privileged processor registers and execute privileged instructions. For example, operating system 130 can set kernel mode bit 112 when performing a context-switch between processes running in the system, in order to access privileged registers that maintain the state of the current process.

In an embodiment, processor 110 can store branch tracing addresses in LBR registers 122 every time a branch instruction executes. In an embodiment, every time a branch instruction executes, processor 110 can store the address execution is jumping from (branch-from address) in one of the LBR registers 122, and store the address execution is jumping to (branch-to address) in another of the LBR registers 122. In an embodiment, processor 110 also to stores whether the branch was taken (moving control flow to the branch-to address) or not taken (moving execution to the next instruction in program order). In an embodiment, processor 110 may utilize specialized circuitry and/or micro-code instructions to store the branch-from addresses, branch-to addresses, and taken statuses in the LBR registers 122, as would be envisioned by those skilled in the relevant arts.

LBR registers 122 can be any type of hardware registers for holding data within the processor. In an embodiment, LBR registers 122 can be a Model Specific Register (MSR). In the case MSRs are used as LBR registers 122, since MSRs can typically only be read in kernel-mode, processor 110 can include an additional user-mode variant of the read MSR instruction. In an embodiment, LBR registers 122 are separate specialized registers, and processor 110 includes an additional instruction to read the LBR registers 122.

In an embodiment, processor 110 provides user-mode read instructions that allow processes to read LBR registers 122. In this way, any process that desires branch tracing information, such as those described above, can easily and efficiently access this information.

LBR control field 124 can be configured to specify the types of branches for which branch tracing information is recorded in LBR registers 122. For example, processor 110 can be configured to only record branch information for certain types of branch instructions. Types of branch instructions can include, by way of example, near jumps, far jumps, loop instructions, calls, returns, etc. In an embodiment, processor 110 can be configured to only record branch information for taken branches (or, conversely, not-taken branches) of any of a specified type. In an embodiment, LBR control field 124 contains a bit for each type of branch instruction as well as a bit each for taken and not-taken branches. If the bit for a type of branch instruction is set, processor 110 will record branch tracing information when it executes a branch instruction of that type. If the bit for that type of branch is not set, processor 110 will not store any branch tracing information for that branch instruction. This allows a user to fine-tune the branch tracing information recorded to gather more useful information and decrease performance overheads.

LBR control bit 126 can be used to cause processor 110 to clear branch tracing information when the processor switches from kernel mode to user mode. When LBR control bit 126 is cleared, processor 110 will clear out branch tracing information in LBR, registers 122. Processor 110 can by default clear LBR control bit 126, and it is up to operating system 130 to set LBR control bit 126 in order to maintain branch tracing information through a kernel to user mode context switch. This can be done in order to maintain backward compatibility with existing operating systems and protect sensitive branch tracing information, as further explained below. For example, it may be undesirable to allow a user-mode process to access the branch tracing information of another process because this could lead to security breaches.

Operating system 130 may or may not support branch tracing information management. If operating system 130 is designed to take advantage of the branch tracing capabilities of processor 110, operating system 130 can set LBR control bit 126. In one example, during a context-switch from a first process to second process, operating system 130 sets processor 110 into kernel mode in order to access privileged registers of the processor. Because LBR control bit 126 is set, LBR registers 122 are not cleared, the operating system 130 can save the branch tracing information of the first process to memory, and restore any branch tracing information of the second process being switched in.

On the other hand, if operating system 130 does not support branch tracing information management LBR control bit 126 will remain in its default cleared value. Therefore, when operating system 130 sets processor 110 into kernel mode during a context-switch, the LBR registers 122 will be cleared and the incoming process will not be able to read the branch tracing information of the previous process. In this way, processor 110 can maintain the security of branch tracing information regardless of whether operating system 130 has been designed to manage this data.

Figure 2:
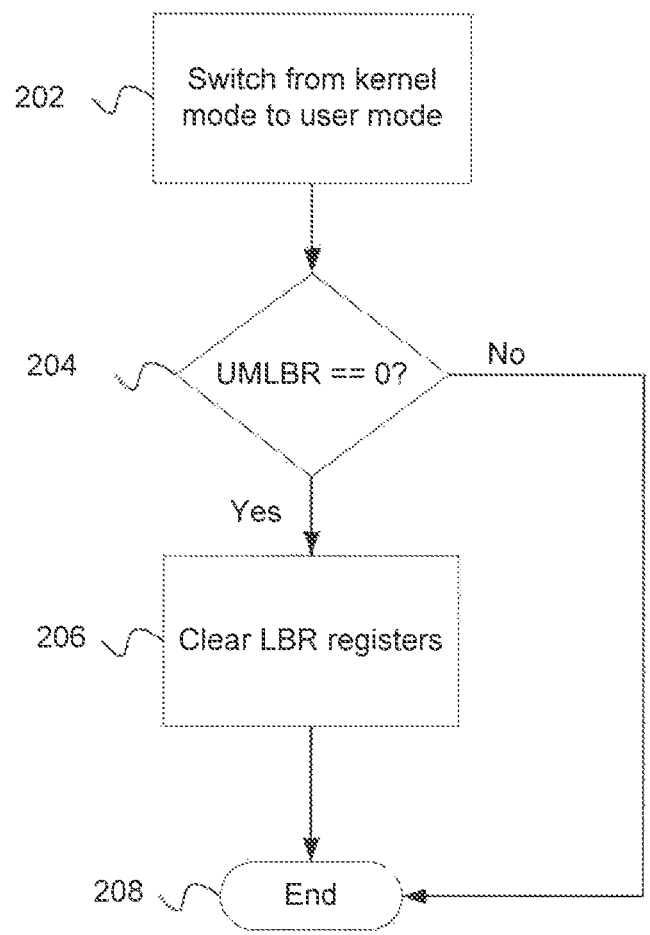
FIG. 2 illustrates an exemplary method of resetting LBR registers when switching from user mode to kernel mode, according to an embodiment.

FIG. 2 illustrates an exemplary method 200 of resetting the LBR registers when switching from user mode to kernel mode, according to an embodiment. It is to be appreciated that not all operations need to be performed, or be performed in the order shown.

At step 202, the operating system sets the processor to kernel mode. This can be accomplished, for example, by setting a kernel triode bit in the processor.

At step 204, the processor checks the value of user-mode LBR control bit (UMLBR). If the UMLBR is cleared, the processor continues to step 206 and clears the LBR registers.

If UMLBR is set, the processor skips step 206 and does not clear the values in the LBR registers.

Figure 3:
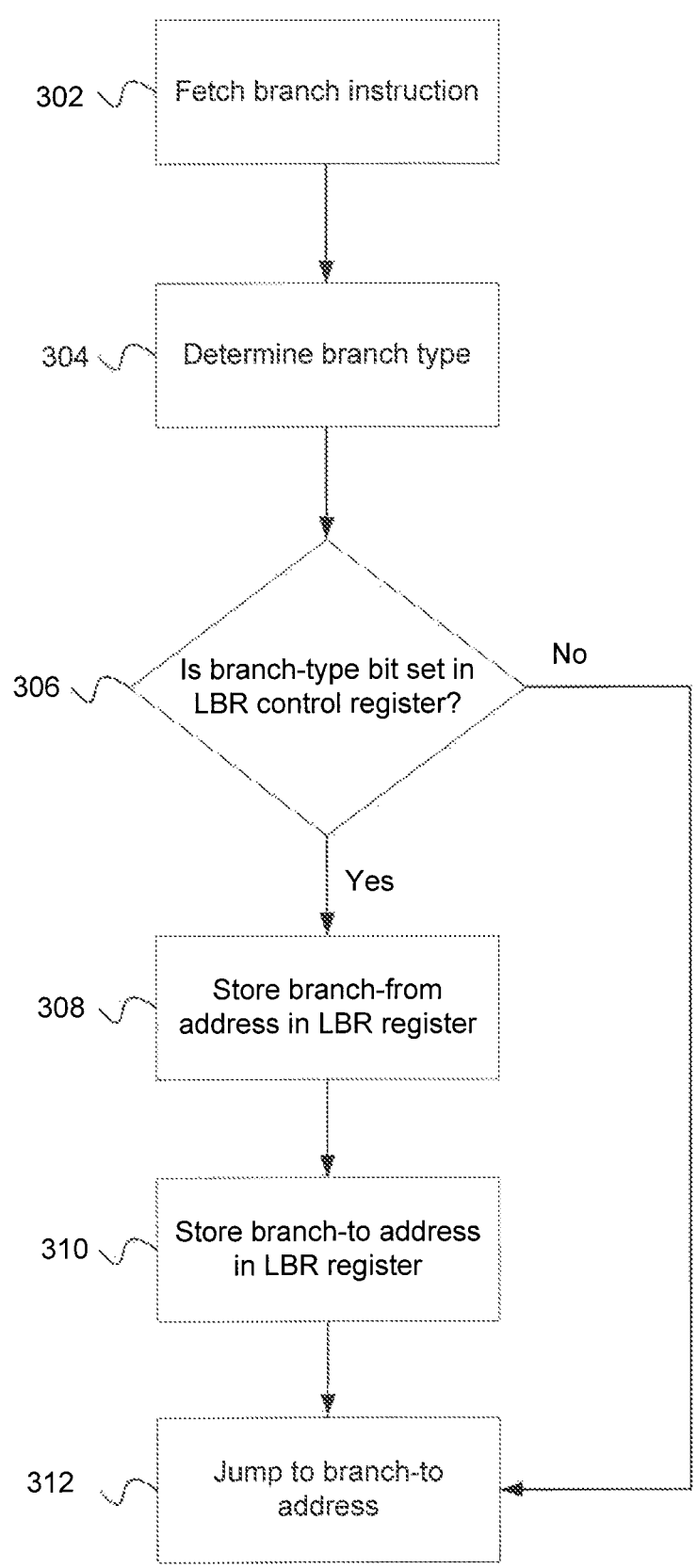
FIG. 3 illustrates an exemplary method of storing branch tracing information in LBR registers depending on branch types, according to an embodiment.

FIG. 3 illustrates an exemplary method 300 of storing branch tracing information in LBR registers depending on branch types, according to an embodiment. It is to be appreciated that not all operations need to be performed, or be performed in the order shown.

At step 302, the processor fetches a branch instruction.

At step 304, the processor determines the type of the branch instruction. The type of branch instructions might be based on, for example, the type of instruction (e.g., jump, loop, call, return, etc.) or the branch-from and branch-to addresses (e.g., near jump, far jump, etc.).

At step 306, the processor checks the LBR control register for the bit corresponding to the determined type of the branch instruction. If the bit for the branch type is set, the processor continues to steps 308 and 310 and stores a branch-from address and branch-to addresses in the LBR registers. In an embodiment, the processor stores addresses in LBR registers in a first-in first-out (FIFO) manner, thus keeping the last n branch addresses in the LBR registers. In an embodiment, the processor can adjust the number n of LBR registers by assigning more or less registers to serve as LBR registers. Other ways of allocating LBR registers, as will be envisioned by those skilled in the relevant arts, are meant to be encompassed herein.

If at step 306 the processor finds the bit for the branch type is not set, the processor skips steps 308 and 310 and continues to step 312.

At step 312, the processor executes the branch instruction by jumping to the branch-to address.

Figure 4:
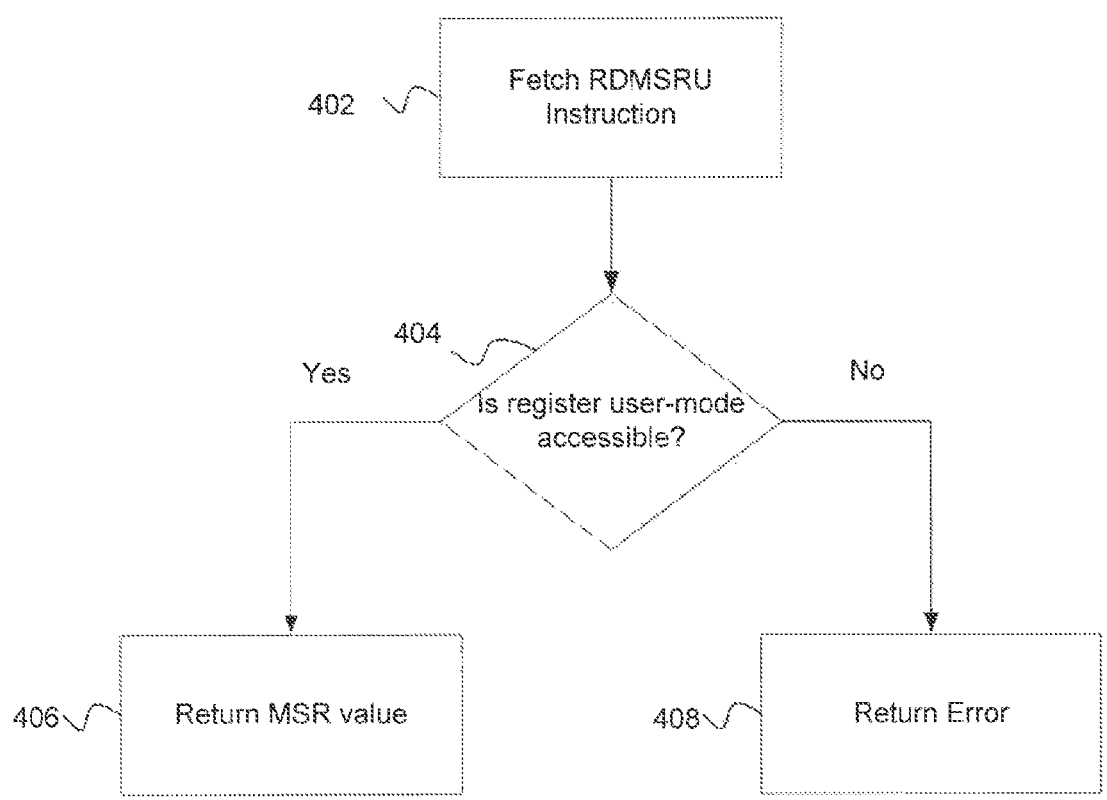
FIG. 4 illustrates an exemplary method of reading LRU registers, where MSR registers are used as LRU registers, according to an embodiment.

As previously mentioned, the processor can use MSR registers as LBR registers, i.e., to maintain branch tracing information. In such a case, the processor can provide a user-mode variant of the read MSR instruction (e.g., RDMSRU), in order to allow user-mode processes to access the branch tracing information. FIG. 4 illustrates an exemplary method 400 of reading LRU registers, where MSR registers are used as LRU registers, according to an embodiment. It is to be appreciated that not all operations need to be performed, or be performed in the order show.

At step 402, the processor fetches a RDMSRU instruction reading an MSR register.

At step 404, the processor verifies whether the MSR register of the read instruction is one of the MSR registers assigned as LBR registers. If the MSR register is assigned as an LBR register, the processor proceeds to step 406 and loads the value of the MSR register. If the MSR register is not assigned as an LBR register, the processor proceeds to step 408 and returns an error, or otherwise denied access to the MSR register. In an embodiment, if at step 404 the MSR register is not one of the assigned LBR registers, the value may nevertheless be returned if the processor is on kernel mode. However, this step is optional, since the operating system can use a kernel-mode read MSR instruction for this purpose.

The embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the embodiments that others can, by applying knowledge within the skill of the art, readily modify and/or adapt for various applications such specific embodiments, without undue experimentation, without departing from the general concept of the present embodiments. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

Figure 5:
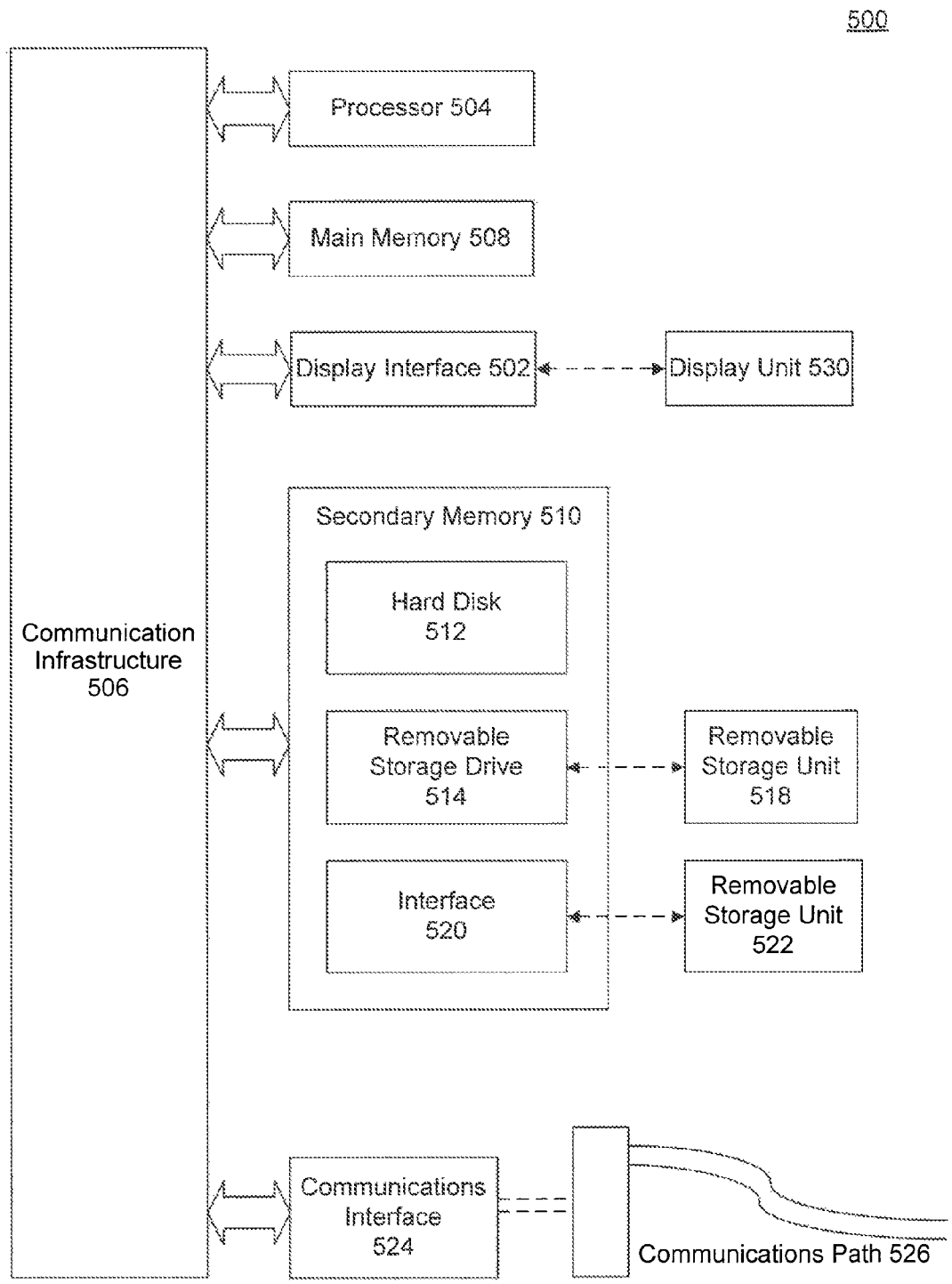
FIG. 5 is an illustration of an example computer system in which embodiments, or portions thereof, can be implemented.

Various aspects of embodiments of the present embodiments may be implemented in software, firmware, hardware, or a combination thereof. FIG. 5 is an illustration of an example computer system 500 in which embodiments, or portions thereof, can be implemented as computer-readable code. For example, the methods illustrated in the present disclosure can be implemented in portions system 500. Various embodiments are described in terms of this example computer system 500. After reading this description, it will become apparent to a person skilled in the relevant art how to implement embodiments using other computer systems and/or computer architectures.

It should be noted that the simulation, synthesis and/or manufacture of various embodiments may be accomplished, in part, through the use of computer readable code, including general programming languages (such as C or C++), hardware description languages (HDL) such as, for example, Verilog HDL, VHDL, Altera HDL (AHDL), other available programming and/or schematic capture tools (such as circuit capture tools), or hardware-level instructions implementing higher-level machine code instructions (e.g., microcode). This computer readable code can be disposed in any known computer-usable medium including a semiconductor, magnetic disk, optical disk (such as CD-ROM, DVD-ROM). As such, the code can be transmitted over communication networks including the Internet. It is understood that the functions accomplished and/or structure provided by the systems and techniques described above can be represented in a core (e.g., a CPU core) that is embodied in program code and can be transformed to hardware as part of the production of integrated circuits.

Computer system 500 includes one or more processors, such as processor 504. Processor 504 may be a special purpose or a general-purpose processor. For example, in an embodiment, processor 110 of FIG. 1 may serve the function of processor 504. Processor 504 is connected to a communication infrastructure 506 (e.g., a bus or network).

Computer system 500 also includes a main memory 508 (e.g., random access memory (RAM)), and may also include a secondary memory 510. Secondary memory 510 can include, for example, a hard disk drive 512, a removable storage drive 514, and/or a memory stick. Removable storage drive 514 can include a floppy disk drive, a magnetic tape drive, an optical disk drive, a flash memory, or the like. The removable storage drive 514 reads from and/or writes to a removable storage unit 518 in a well-known manner. Removable storage unit 518 can comprise a floppy disk, magnetic tape, optical disk, etc. which is read by and written to by removable storage drive 514. As will be appreciated by persons skilled in the relevant art, removable storage unit 518 includes a computer-usable storage medium having stored therein computer software and/or data.

In alternative implementations, secondary memory 510 can include other similar devices for allowing computer programs or other instructions to be loaded into computer system 500. Such devices can include, for example, a removable storage unit 522 and an interface 520. Examples of such devices can include a program cartridge and cartridge interface (such as those found in video game devices), a removable memory chip (e.g., EPROM or PROM) and associated socket, and other removable storage units 522 and interfaces 520 which allow software and data to be transferred from the removable storage unit 522 to computer system 500.

Computer system 500 can also include a communications interface 524. Communications interface 524 allows software and data to be transferred between computer system 500 and external devices. Communications interface 524 can include a modem, a network interface (such as an Ethernet card), a communications port, a PCMCIA slot and card, or the like. Software and data transferred via communications interface 524 are in the form of signals which may be electronic, electromagnetic, optical, or other signals capable of being received by communications interface 524. These signals are provided to communications interface 524 via a communications path 526. Communications path 526 carries signals and can be implemented using wire or cable, fiber optics, a phone line, a cellular phone link, a RF link or other communications channels.

In this document, the terms "computer program medium" and "computer-usable medium" are used to generally refer to media such as removable storage unit 518, removable storage unit 522, and a hard disk installed in hard disk drive 512. Computer program medium and computer-usable medium can also refer to memories, such as main memory 508 and secondary memory 510, which can be memory semiconductors (e.g., DRAMs, etc.). These computer program products provide software to computer system 500.

Computer programs (also called computer control logic) are stored in main memory 508, secondary memory 510 and/or removable storage units 518 and 522. Computer programs may also be received via communications interface 524. Such computer programs, when executed, enable computer system 500 to implement embodiments as discussed herein. In particular, the computer programs, when executed, enable processor 504 to implement processes of embodiments, such as the steps in the methods illustrated by the flowcharts of the figures discussed above. Accordingly, such computer programs represent controllers of the computer system 500. Where embodiments are implemented using software, the software can be stored in a computer program product and loaded into computer system 500 using removable storage drive 514, interface 520, hard drive 512, or communications interface 524.

Embodiments are also directed to computer program products including software stored on any computer-usable medium. Such software, when executed in one or more data processing device, causes a data processing device(s) to operate as described herein. Embodiments employ any computer-usable or -readable medium, known now or in the future. Examples of computer-usable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nanotechnological storage devices, etc.), and communication mediums (e.g., wired and wireless communications networks, local area networks, wide area networks, intranets, etc.).

What is claimed is:

1. A processor comprising:
   at least one bit configured to indicate whether the processor is operating in a kernel mode or a user mode, wherein the processor in the kernel mode allows access to read and write to registers that are inaccessible in the user mode;
   a plurality of hardware registers configured to store one or more branch tracing addresses when a branch instruction is executed, wherein the hardware registers may be read by both a kernel mode instruction and a user mode instruction;
   circuitry configured to, in response to executing a branch instruction, store a branch-from address and a branch-to address in the hardware registers; and
   a control bit that indicates whether to maintain the stored branch tracing addresses in the plurality of hardware registers when the processor switches between the kernel mode and the user mode.

2. The processor of claim 1, wherein the storing of the branch-from address and the branch-to address depends on a type of the branch instruction.

3. The processor of claim 1, further comprising a control register, wherein the control register comprises at least one bit, the at least one bit corresponding to a type of branch, and wherein the storing of the branch-from address and the branch-to address depends on whether the at least one bit corresponding to the type of the branch instruction is set.

4. The processor of claim 1, wherein the type of the branch instruction comprises a near jump, a far jump, a loop instruction, a call instruction, a return instruction, a taken branch or a not-taken branch.

5. The processor of claim 1, wherein at least one of the registers comprises a model specific register.

6. A computer-implemented method comprising:
   determining whether a processor is operating in a kernel mode or a user mode, wherein the processor in the kernel mode allows access to read and write to registers that are inaccessible in the user mode;
   retrieving a branch instruction;
   storing one or more branch tracing addresses in a plurality of hardware registers when a branch instruction is executed, wherein the hardware registers may be read by both a kernel mode instruction and a user mode instruction and the one or more branch tracing addresses include a branch-from address and a branch-to address; and
   determining whether to maintain the stored branch tracing addresses in the plurality of hardware registers when the processor switches between the kernel mode and the user mode.

7. The method of claim 6, wherein the storing of the branch-from address and the branch-to address depends on a type of the branch instruction.

8. The method of claim 6, further comprising: reading a control register, wherein the control register comprises at least one bit, the at least one bit corresponding to a type of branch, and storing of the branch-from address and the branch-to address depends on whether the at least one bit corresponding to the type of the branch instruction is set.

9. The method of claim 6, wherein the type of the branch instruction is selected from the group consisting of a near jump, a far jump, a loop instruction, a call instruction, a return instruction, a taken branch and a not-taken branch.

10. The method of claim 6, further comprising using a model specific register as at least one of the registers.

11. A non-transitory computer-readable storage medium having instructions stored thereon, execution of which by a processor cause the processor to perform operations, the operations comprising:
    determining whether the processor is operating in a kernel mode or a user mode, wherein the processor in the kernel mode allows access to read and write to registers that are inaccessible in the user mode;

retrieving a branch instruction;

storing one or more branch tracing addresses in a plurality of hardware registers when a branch instruction is executed, wherein the hardware registers may be read by both a kernel mode instruction and a user mode instruction and the one or more branch tracing addresses include a branch-from address and a branch-to address; and determining whether to maintain the stored branch tracing addresses in the plurality of hardware registers when the processor switches between the kernel mode and the user mode.

12. The non-transitory computer-readable storage medium of claim 11, wherein the storing of the branch-from address and the branch-to address depends on a type of the branch instruction.

13. The non-transitory computer-readable storage medium of claim 11, further comprising: reading a control register, wherein the control register comprises at least one bit, the at least one bit corresponding to a type of branch, and storing of the branch-from address and the branch-to address depends on whether the at least one bit corresponding to the type of the branch instruction is set.

14. The non-transitory computer-readable storage medium of claim 11, wherein the type of the branch instruction is selected from the group consisting of a near jump, a far jump, a loop instruction, a call instruction, a return instruction, a taken branch and a not-taken branch.

15. The non-transitory computer-readable medium of claim 11, wherein at least one of the registers comprises a model specific register.

\* \* \* \* \*